United States Patent Office 3,104,227
Patented Sept. 17, 1963

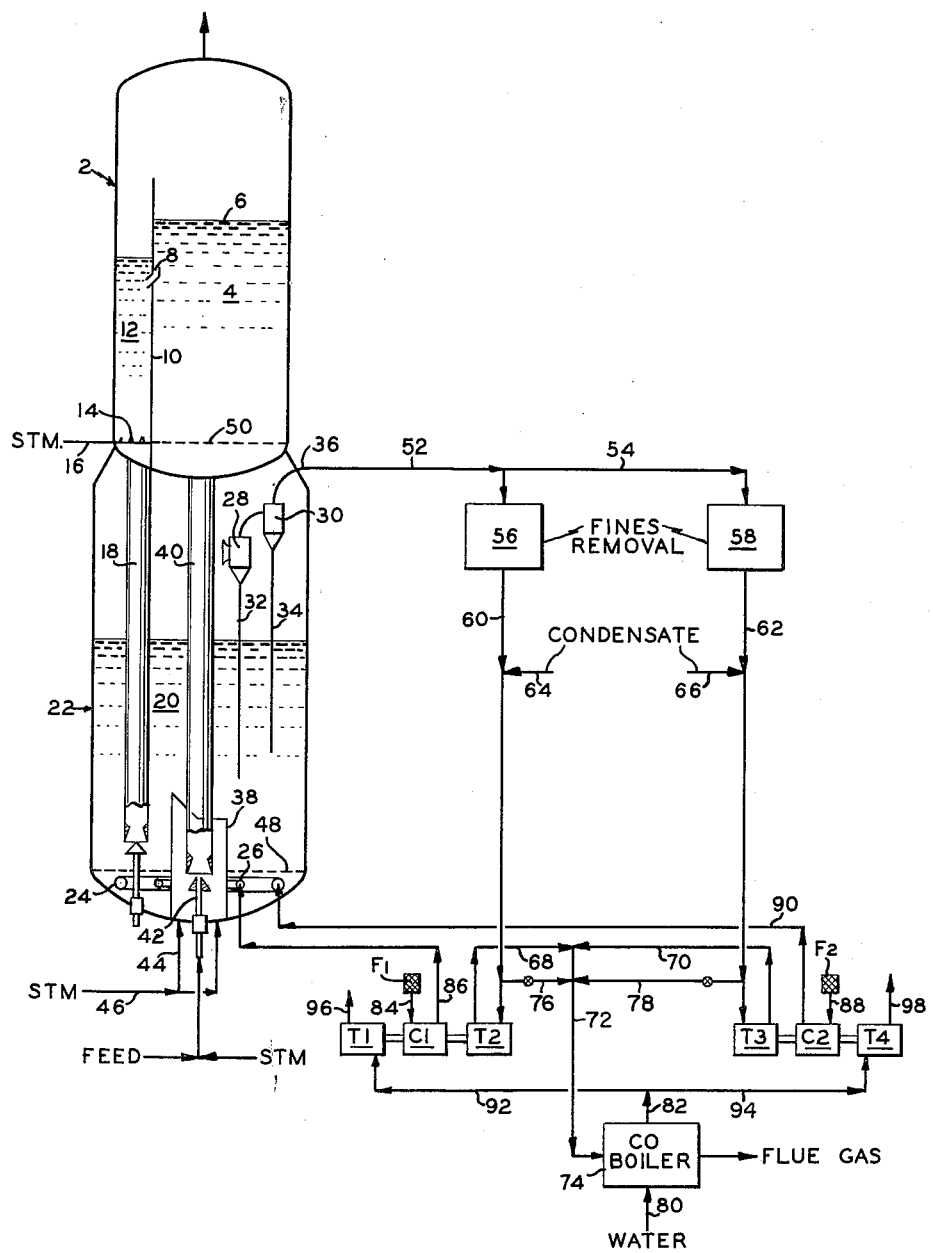

3,104,227
METHOD FOR SUPPLYING REGENERATION GAS TO A REGENERATION ZONE
Robert W. Pfeiffer and Gareld R. Herrin, Bronxville, N.Y., assignors to The M. W. Kellogg Company, Jersey City, N.J., a corporation of Delaware
Filed Oct. 20, 1959, Ser. No. 847,484
10 Claims. (Cl. 252—417)

This invention relates to a method of supplying gaseous material for use in chemical metallurgical and hydrocarbon conversion processes. More specifically, the invention is directed to an arrangement of process steps employing a turbine-compressor combination for supplying regeneration gas to a fluid bed of finely divided solid particle material.

Turbine-compressor combinations have been proposed for supplying gaseous material and particularly regeneration gaseous material to hydrocarbon conversion processes, but have not been completely acceptable commercially for a variety of reasons including (1) the non-availability of a turbine-compressor of sufficient capacity to supply a large volume of gaseous material required, (2) the necessity to employ a relatively large number of turbine-compressors in parallel flow arrangement, thereby necessitating elaborate and expensive piping systems, and (3) relatively high initial investment and operating cost. These problems become amplified in processes requiring relatively large volumes of gaseous material and are of particular importance in catalytic cracking processes. In modern catalytic cracking processes, and especially fluidized catalytic cracking processes wherein relatively large vessels are employed having a high catalyst inventory of the order of about 1,000 tons of catalyst, the cost associated with air compressor requirements and particularly the facilities required to drive the air compressor constitute one of the major cost items of a catalytic cracking system. Consequently, the regeneration stage quite often will impose undesired limitations on the capacity of a given commercial unit. As a result thereof, every effort is made to reduce the initial investment and operating costs associated with the catalytic cracking regeneration system.

It is an object of this invention to provide an improved arrangement of process steps directed to reducing expenditures associated with the regeneration system of a catalytic cracking process.

Another object of this invention is to provide an improved arrangement of process steps for supplying regeneration gas for a catalytic cracking system employing a turbine-compressor combination.

Other objects and advantages of this invention will become apparent from the following description.

In one embodiment, this invention is directed to expanding flue gas at substantially the temperature and pressure of the flue gas recovered from the regeneration zone of a fluid catalytic cracking process in a flue gas turbine to supply a portion of the power required to drive an air compressor with the remaining portion of the power required to drive the air compressor being supplied by auxiliary power generating equipment directly connected therewith such as a steam turbine, electric motor or other suitable equipment.

It has long been recognized that the regeneration of catalyst in a catalytic cracking process releases relatively large amounts of energy which, if properly recovered or harnessed, may be utilized in the process. Applicants' approach to this recovery problem has been directed to the development of a simplified system which is economically attractive and thermodynamically efficient.

In a relatively dense fluidized catalyst bed regeneration system operating at an elevated temperature of about 1150° F. from which relatively hot flue gases are withdrawn at a temperature of about 1070° F. and a pressure of about 19 p.s.i.g., the heat content of the flue gas is such that about 70 B.t.u. per pound is available for conversion to useful power by the expansion of the flue gas through a simple turbine device. When a turbine-compressor combination is adapted to a fluid catalytic cracking system, the regenerator is employed and may be considered as a combustion chamber from which hot effluent flue gas is recovered at an elevated temperature and pressure and expanded in the turbine to develop a major portion of the power to drive the air compressor. However, when a fluid catalytic bed regeneration system is employed the flue gases recovered at an elevated temperature are of reduced pressure because of a pressure drop encountered in the fluid catalyst bed in the regenerator in addition to a small pressure drop encountered in the recovery of flue gases from entrained finely divided solid particle material. Furthermore, the necessary piping to convey the hot flue gases to suitable separator equipment for removal of entrained fines from the flue gas all combine to add to the pressure drop of the system whereby the inlet pressure to the turbine is less than the outlet pressure of the compressor. Under these conditions insufficient power can be developed by expansion of the flue gases in the turbine to drive the compressor as required. By the improved arrangement of process steps of this invention a highly efficient and simplified system is provided which overcome the above power deficiency in an economical manner by employing, in one embodiment, a steam turbine in conjunction with the flue gas expander turbine of sufficient capacity to provide the necessary incremental power requirement to drive the compressor as desired.

In a system of the type herein discussed, power recovery initially increases with increasing pressure and it is preferred to employ a relatively high pressure regeneration system, the higher the pressure the better, within limits of commercially available equipment, since such a system will reduce the incremental power requirement to be developed by the auxiliary equipment employed with the flue gas expander turbine.

In the system herein considered, the coke burning capacity of the regenerator is of the order of about 50,000 pounds per hour therby requiring large volumes of regeneration gas or air of the order of about 150,000 c.f.m. to be supplied to the regenerator. One difficulty in systems requiring such large volumes of regeneration gas is that single turbine-compressor arrangements commercially available do not have sufficient capacity to supply the large volume of regeneration gas required. Accordingly, applicants propose to employ one or more turbine compressor arrangements in parallel flow arrangement to supply the desired quantity of regeneration gas to the system. In addition, applicants propose to employ a relatively low temperature flue gas in the process which is economically desirable since it virtually eliminates the need to use expensive alloys in the flue gas recovery system and turbine blades in the flue gas turbine. In addition, the parallel system proposed herein offers desirable safety features in the operation of the process in the event that one of the expander turbines malfunctions and must be shut down since the regeneration operation may be continued at a reduced capacity with the remaining operational turbine compressor arrangement until the defect has been corrected. This desirable safety feature is of major importance to the refiner today when employing large capacity catalytic cracking processes.

In the system herein proposed atmospheric air is compressed to an elevated pressure in the range of from about 25 to about 65 p.s.i.a., preferably about 43 p.s.i.a., thereby elevating the temperature of the compressed air within the range of from about 175° F. to about 550° F. with the thus heated and compressed air being at a suitably elevated temperature for direct passage to the air distributor ring in the regeneration chamber with or without using the regeneration air preheaters. In the regenerator, the compressed air stream is heated to an elevated temperature above about 1000° F., more usually in the range of from about 1000° F. to about 1200° F. by combustion of carbonaceous material on the catalyst deposited there during the hydrocarbon conversion step. During regeneration the activity of the catalyst is suitably restored for re-use and recycling to the hydrocarbon conversion step of the catalytic cracking process. The products of combustion or hot flue gases, including CO and $CO_2$ and containing entrained finely divided solid particle material not completely removed in the cyclone separators within the regenerator, are recovered from the regenerator, separated into at least two streams substantially equal by volume and the streams separately passed at an elevated temperature below about 1200° F. and elevated pressure through additional suitable separator equipment for removal of additional entrained fines to a desirably low value. The separator equipment employed in the final stage of fines removal from the flue gas effectively reduces the concentration of entrained fines in the separate flue gas streams to a value below about 30 parts per million (p.p.m.) and at least in the range of from about 15 to about 30 p.p.m., or below about .05 grain/cu. ft. Thereafter, the hot flue gas is partially cooled by the direct introduction of a suitable cooling fluid thereto, such as steam or water, to reduce the temperature of the flue gas suitable for introduction into the expander-turbine. One of the controlling cost items of the process herein described is the temperature employed in the expander-turbine since this temperature will dictate the types of metals which may be successfully employed in fabricating the turbine with higher temperatures, requiring the use of more expensive alloys, thereby increasing the cost of the turbine. To avoid the use of such costly items, and minimize the cost of the expander-turbine, the flue gases are cooled to a desirable temperature which will be accepted for relatively long blade life of the turbine. The thus cooled flue gases containing a relatively small amount of finely divided solid particle material, insufficient to materially damage the turbine blades, may then be introduced into the turbine and expanded to a pressure in the range of from about 5 p.s.i.g. to about 0 p.s.i.g., preferably about 1 p.s.i.g., and a temperature in the range of from about 700° F. to about 900° F., preferably about 800° F. The flue gas turbine employed herein and under the conditions herein described will produce a major portion of the power requirements of the compressor, which may be as high as 80 to 90 percent of the power required to drive the compressor or air blower at its rated capacity. As hereinbefore indicated, applicants propose to employ in one embodiment a steam-turbine directly connected to the compressor and in conjunction with the flue gas expander turbine for the purpose of supplying the incremental power requirement of the compressor, which may amount to from about 10 percent to about 20 percent of the total power required to drive the compressor.

In the system herein described, the expanded flue gases recovered at a temperature below about 1000° F. from each expander-turbine are combined with any excess flue gas not passed to the turbines and the combined gases passed at an elevated temperature to a suitable low pressure CO boiler-steam generating zone wherein unburned CO in the flue gas amounting to from about 3 to about 9 volume percent is burned to reheat the flue gases to an elevated temperature of about 1400° F. and the thus heated flue gas is then employed for the production of steam.

By this novel and improved arrangement of process steps for handling the flue gases recovered from the regenerator, the available heat energy of flue gases is recovered in a thermodynamically efficient manner without requiring the use of expensive alloys in the flue gas recovery system or the turbines. In the CO boiler-steam generating zone employed in this arrangement, relatively large quantities of steam are produced which are in excess of that required in a steam turbine to provide the incremental power requirement of the compressor. Accordingly, it is contemplated in an embodiment of this invention where more than enough or sufficient process steam is readily available from other sources of using the steam developed in the CO boiler-steam generating zone to develop electrical power for the process and employ an electrically driven motor to supply the incremental power requirement of the compressor. Accordingly, by the improved arrangement of steps herein described, relatively large economic savings are realized by avoiding the use of expensive alloys in the equipment and the recovery of the available energy of the flue gases in a simplified and thermodynamically efficient manner to provide useful energy which is readily available for use in the regeneration process, as well as other portions of the refinery connected therewith.

Having thus described the improved process and arrangement of steps of this invention, reference is now had by way of example to the drawing which presents digrammatically a preferred arrangement of process steps of this invention as applied in a catalytic cracking hydrocarbon conversion process.

A vessel is shown having an upper reaction chamber 2 containing a relatively dense fluidized bed of catalyst 4 having an upper level or meniscus 6 wherein conversion of hydrocarbons to desired products is effected at desired elevated temperature and pressure conversion conditions. During conversion of the hydrocarbon reactant material the catalyst becomes contaminated with products of reaction and carbonaceous deposits. The thus contaminated catalyst is withdrawn from the dense bed of catalyst 4 and passed by passageway 8 in baffle member 10 which provides a separate stripping zone adjacent to the reaction zone containing a bed of catalyst 12. In the stripping zone the catalyst is stripped with suitable stripping gas introduced to the lower portion of the catalyst bed 12 by distributor device 14 connected to conduit 16. Products of reaction and adsorbed hydrocarbons are removed from the catalyst in the stripping section, and thereafter the stripped catalyst is withdrawn from substantially the bottom of the stripping section and passed by standpipe 18 into the lower portion of a dense bed of catalyst 20 maintained in a regeneration section 22 which is below the reactor stripping section. A suitable plug valve 24 is aligned with the bottom open end of standpipe 18 for purposes of controlling the rate of catalyst discharged from the bottom of the standpipe. In the regeneration section the contaminated catalyst is heated to an elevated temperature by burning of carbonaceous deposits on the catalyst with air supplied to the lower portion of the dense fluidized bed of catalyst 20 through suitable distributor rings 24 and 26. In the specific example herein described, regeneration of the catalyst is effected at a temperature of about 1150° F. and a pressure above the bed of catalyst of about 18.5 p.s.i.g., whereby the catalyst is heated to an elevated temperature and flue gases or products of combustion are recovered from above the dense fluidized catalyst bed and passed through suitable cyclone separators 28 and 30 having diplegs 32 and 34 respectively. In the cyclone separators 28 and 30, finely divided catalytic material entrained with the flue gas is separated from the flue gas and returned to the dense catalyst bed 20 by diplegs 32 and 34, respectively, with the flue gases being removed from the regeneration chamber by conduit 36. The regenerated catalyst is withdrawn from the dense bed of catalyst 20 as an annular stream into a cylindrical well defined by wall 38 and passed to the inlet of riser 40. Aligned with the bottom open end of riser 40 is a hollow stem plug valve 42 through which hydrocarbon reactant and gasiform dispersion material, such as steam, is introduced for mixture with the regenerated catalyst, which mixture is then passed through riser 40 into the lower portion of the dense bed of catalyst 4 in the reaction zone 2. Fluffing steam is introduced to the bottom of the well defined by wall 38 through conduits 44 connected to conduit 46. A distributor grid 48 is positioned in the lower portion of the regeneration zone primarily for the purpose of uniformly distributing regeneration gas throughout the bottom cross-sectional area of the bed of catalyst 20. A distributor grid 50 is also positioned in the lower portion of the reaction zone for the distribution of catalyst and hydrocarbon reactants across the bottom cross-sectional area of bed 4. The flue gases removed from the regeneration vessel by conduit 36 at a temperature of about 1070° F. and a pressure of about 17 p.s.i.g. contain finely divided solid catalytic material not completely removed by the cyclone separator equipment included in the regenerator. That is, the flue gases will contain in the order of about 6,000 p.p.m. of fines in the flue gas, which must be substantially reduced in order to avoid excessive erosion of the blades in the flue gas expander turbine hereinafter discussed. Accordingly, the flue gas stream in conduit 36 is divided into two substantially equal streams and passed by conduits 52 and 54 as parallel streams to suitable fines removal equipment or zones 56 and 58. In the fines removal zones 56 and 58 the concentration of fines in the flue gas stream is reduced to about 30 p.p.m. and preferably in the range of from about 15 to about 30 p.p.m., which has been found to be an acceptable value without causing excessive erosion of the turbine blades hereinafter discussed. The flue gases recovered from each fines removal zone 56 and 58 and at an elevated temperature of about 1050° F. to about 1075° F. and a pressure of about 15 p.s.i.g. are then passed by conduits 60 and 62 to flue gas expander turbines $T_2$ and $T_3$ respectively. Conduits 64 and 66 are provided for the introduction of a cooling fluid directly to the hot flue gas streams recovered from the fines removal zone for the purposes of reducing the temperature of the flue gases to a temperature suitable for introduction into the turbines $T_2$ and $T_3$. A major portion of the flue gas in conduits 60 and 62 suitably cooled to a temperature of about 1050° F. and a pressure of about 14 p.s.i.g. is then expanded in flue gas turbines $T_2$ and $T_3$ to develop a major portion of the power requirements to drive compressors $C_1$ and $C_2$ which are directly connected to the flue gas expander turbines. The expanded flue gases are then recovered from the turbine $T_2$ by conduit 68 and turbine $T_3$ by conduit 70 and combined as a single stream for passage by conduit 72 to a CO boiler 74. A portion of the hot flue gases in conduits 60 and 62 may be withdrawn prior to passing the flue gases to their respective expander turbines by conduits 76 and 78 containing suitable valves therein and combining the hot flue gases thus withdrawn with the expanded flue gases in conduit 72. The expanded flue gases in conduit 72 at a temperature of about 885° F. and a pressure of about 16.2 p.s.i.a. are then passed to a waste heat recovery boiler or to the CO boiler wherein carbon monoxide in the flue gas stream is burned for the production of steam for use in the process. Water is introduced to the CO boiler by conduit 80 and is withdrawn as steam by conduit 82 for use in the system as more fully described hereinafter. By the expansion of the hot flue gases in turbines $T_2$ and $T_3$ a major portion of the power required to drive the compressors directly connected thereto is developed. Atmospheric air after passage through a suitable filter $F_1$ is introduced to compressor $C_1$ by conduit 84 wherein the air is compressed to an elevated pressure of 43 p.s.i.a. and a temperature of about 365° F. The thus compressed air is withdrawn from compressor $C_1$ by conduit 86 and passed to distributor ring 26. Similarly, atmospheric air is passed through filter $F_2$ and conduit 88 into compressor $C_2$ wherein the air is compressed to an elevated pressure of about 43 p.s.i.g. and a temperature of about 365° F. The thus compressed air at an elevated temperature is withdrawn by conduit 90 and passed to air distributor ring 24. As hereinbefore indicated, because of the pressure drop existing in the fluidized bed of catalyst in the regeneration chamber, the fines removal system and the interconnecting piping, the pressure of the flue gas introduced to turbines $T_2$ and $T_3$ is below the discharge pressure from the compressors $C_1$ and $C_2$. In order to provide the additional incremental horsepower requirement to drive compressors $C_1$ and $C_2$ over that developed by turbines $T_2$ and $T_3$ suitable individual steam turbines $T_1$ and $T_4$ are provided which are directly connected to compressors $C_1$ and $C_2$ respectively. The steam developed by CO boiler 74 and recovered by conduit 82 is divided into two streams and passed by conduits 92 and 94 to steam turbines $T_1$ and $T_4$ respectively with the expanded steam being withdrawn from turbine $T_1$ by conduit 96 and from turbine $T_4$ by conduit 98. In this parallel arrangement of employing flue gases to drive suitable flue gas expander turbines directly connected to suitable compressors, sufficient compressed air is provided for the coke burning capacity of the regenerator, which is about 50,000 pounds per hour.

Having thus generally described the improved method and sequence of steps of this invention and described a specific embodiment thereof, it is to be understood that no undue restrictions are to be imposed as a result thereof and modifications may be made thereto without departing from the scope thereof.

Having thus described the invention, we claim:

1. A method for utilizing flue gas recovered from a regeneration zone in the supply of regeneration gas to the regeneration zone which comprises recovering flue gas from a regeneration zone, separating recovered flue gas into two separate flue gas streams for parallel flow through the steps hereinafter described, removing entrained finely divided particle material in each of said flue gas streams, passing the flue gas streams after removal of fines and at a suitable elevated temperature to separate flue gas turbines, expanding said flue gas streams to a reduced pressure in said separate turbines under conditions to provide the major portion of the power required to drive separate compressors directly connected to the separate turbines, recovering expanded flue gas from said turbines at an elevated temperature, generating steam with the expanded flue gas, employing steam generated from said expanded flue gas to provide the remaining portion of the power required to drive the separate compressors by passing steam through separate steam turbines directly connected to said separate compressors and employing the compressors to compress regeneration gas to a suitable elevated pressure for passage to said regeneration zone.

2. A method for supplying regeneration gas to a regeneration zone which comprises, recovering flue gas from a regeneration zone at an elevated temperature but below the pressure at which regeneration gas is supplied to said regeneration zone, separating said recovered flue gas into at least two separate flue gas streams, separately cooling each of said flue gas streams by the direct addition of a condensate material thereto to cool said flue gas to a temperature suitable for use in flue gas expander turbine zones, separately expanding each flue gas stream in a turbine zone under conditions to provide a portion of the power for a compressor zone attached to each flue gas turbine zone, recovering expanded flue gases from each turbine zone as a combined stream, passing the combined flue gas stream to a steam generating zone, generating steam at an elevated temperature with the flue gas in said steam generating zone, passing steam from said steam generating zone to separate steam turbine zones directly connected to said separate compressors, generating sufficient power in said steam turbine zone to provide a portion of the power required for the compressor zones attached thereto and employing the compressor zones to provide relatively large amounts of regeneration gas at a sufficiently elevated pressure for use in the regeneration zone.

3. A method for providing large volumes of regeneration gas to a regeneration zone which comprises recovering flue gases at an elevated temperature and pressure from a regeneration zone, said flue gases containing entrained carbon monoxide and finely divided solid material therein, separating the flue gases into at least two separate streams, separately removing from each stream without substantially cooling thereof entrained finely divided solid material in a fines removal zone, recovering flue gas separately from each fines removal zone for further separation into a major flue gas stream and a minor flue gas stream, combining the minor flue gas streams, partially cooling each of said major flue gas streams by introducing a cooling fluid thereto, passing each of said partially cooled major flue gas streams to separate flue gas expander turbine zones, each of said flue gas turbine zones being directly connected to a separate compressor zone, expanding the partially cooled major flue gas streams in the turbine zone to which they are passed to develop a portion of the power required to drive the compressor zone attached to each flue gas turbine zone, recovering expanded flue gases from said turbine zones as a combined stream, combining the thus recovered expanded flue gases with the combined minor flue gas stream, generating steam with the combined flue gases by burning carbon monoxide contained therein in a steam generating zone and employing steam from said steam generating zone to generate the remaining portion of the power required to drive each of the compressor zones.

4. A method for providing relatively large amounts of an oxygen-containing regeneration gas to a regeneration zone containing fluidized finely divided particle material which comprises recovering oxygen-containing regeneration gas from a plurality of compressor zones at a suitably elevated pressure for passage to a regeneration zone maintained at a pressure above about 10 p.s.i.g., passing said oxygen-containing regeneration gas recovered from said plurality of compression zones to said regeneration zone, recovering a flue gas from said regeneration zone at an elevated pressure and a temperature above about 1000° F., said flue gas containing entrained finely divided particle material and carbon monoxide, recovering said flue gas from said regeneration zone for passage without substantial cooling thereof to a plurality of parallel arranged fines removal zones, removing fines from said flue gas in said fines removal zones, separately recovering flue gas from each of said fines removal zones, each of said plurality of compression zones being separately connected to a flue gas turbine zone, passing a portion of the flue gases recovered from each of said fines removal zones to each of said flue gas turbine zones under conditions to develop by expansion of flue gas therein a major portion of the power required to drive the compressor zone attached thereto, removing expanded flue gas from each of said turbine zones, combining the expanded flue gases from each of said turbine zones with the remaining portion of the flue gases removed from each of the fines removal zones, burning carbon monoxide contained in the combined flue gases in a steam generating zone, recovering steam at an elevated temperature and pressure from said steam generating zone and employing the recovered steam to develop the remaining portion of the power in the form of electrical energy required to drive the compressor zones.

5. A method for utilizing the available energy of a carbon monoxide containing flue gas recovered from a regeneration zone at an elevated temperature and a pressure not substantially reduced by more than the pressure drop of the process which comprises recovering regeneration gas at an elevated temperature and pressure from a compression zone for passage to a fluidized catalytic regeneration zone, recovering flue gases containing carbon monoxide and finely divided catalytic material at an elevated temperature and pressure from said regeneration zone, removing finely divided catalytic material from said flue gas in at least one fines removal zone, recovering flue gas of reduced fines content at an elevated temperature and pressure from said fines removal zone, partially cooling said recovered flue gas and passing a portion of said partially cooled flue gas to a flue gas turbine power generating zone operated under conditions to develop the major portion of the power required to drive said compression zone, recovering expanded flue gas from said turbine zone, combining expanded flue gases with a portion of the flue gas recovered from said fines removal zone, burning carbon monoxide contained in said combined flue gases in a steam generating zone and employing steam generated in said steam generating zone to develop the remaining portion of the power required to drive said compression zone.

6. A method for supplying regeneration gas to a regeneration zone comprising recovering flue gas from a regeneration zone, passing a portion of the recovered flue gas at a suitably elevated temperature and a pressure less than the pressure of the regeneration gas supplied to the regeneration zone equivalent to the pressure drop of the system and after removal of finely divided particle material therefrom to a flue gas turbine zone to develop the major portion of the power required to drive a compressor zone, recovering expanded flue gas at an elevated temperature from said flue gas turbine zone, combining the expanded flue gas with the remaining portion of the flue gas having fines removed therefrom, heating the combined flue gases by burning carbon monoxide contained therein and employing the thus heated flue gas to generate steam in a steam generation zone, passing sufficient steam from said steam generating zone to a steam turbine zone to develop the remaining portion of the power required to drive said compressor zone and employing the compressor zone to supply the regeneration gas at a suitably elevated pressure to said regeneration zone.

7. A method for employing at least one machine comprising a compressor driven by a flue gas expander turbine to supply regeneration gas to a regeneration zone which comprises passing compressed regeneration gas from a compressor to a relatively high-pressure catalytic regeneration zone, recovering a flue gas at an elevated temperature above about 1000° F. and containing carbon monoxide from said regeneration zone, passing a portion of the recovered flue gas at a temperature above about 1000° F. and a pressure below the pressure of the regeneration gas passed to said regeneration zone to a flue gas expander turbine to generate a portion of the power required to drive a compressor, recovering expanded flue gas containing carbon monoxide from said flue gas turbine at a temperature below about 1000° F., combining the expanded flue gas with another portion of the flue gas recovered from said regeneration zone, burning the carbon monoxide contained in the combined flue gases under conditions to generate steam in a steam generating zone and employing a portion of the steam from said steam generating zone to develop the remaining portion of the power required to drive the compressor over that supplied by said flue gas expander turbine.

8. The method of claim 7 wherein a plurality of said machines are employed in parallel flow arrangement.

9. The method of claim 7 wherein the flue gas passed to said flue gas turbine is partially cooled by the direct introduction of vaporizable liquid thereto.

10. The method of claim 7 wherein finely divided particle material is entrained in the flue gas recovered from the regeneration zone which finely divided particle material is removed in a plurality of fines removal zones sufficiently to permit expansion of the flue gases through the flue gas turbine zone without substantial damage to said turbine zone.

References Cited in the file of this patent

UNITED STATES PATENTS

| | | |
|---|---|---|
| 2,167,655 | Houdry et al. | Aug. 1, 1939 |
| 2,167,698 | Vose | Aug. 1, 1939 |
| 2,307,672 | Dunham | Jan. 5, 1943 |
| 2,339,846 | Eastman et al. | Jan. 25, 1944 |
| 2,357,365 | Van Horn et al. | Sept. 5, 1944 |